United States Patent [19]

Merrick

[11] 3,853,342

[45] Dec. 10, 1974

[54] DOOR RETAINER LATCH

[76] Inventor: Robert Alfred Merrick, 743 S. Bryant St., Denver, Colo.

[22] Filed: May 14, 1973

[21] Appl. No.: 359,797

[52] U.S. Cl. .............................. 292/262, 292/129
[51] Int. Cl. ........................................... E05c 17/04
[58] Field of Search .......................... 292/262, 129

[56] References Cited
UNITED STATES PATENTS

| 249,087 | 11/1881 | Pike | 292/262 X |
| 1,007,398 | 10/1911 | Snider | 292/129 |
| 1,083,904 | 1/1914 | Mertsheimer | 292/262 |
| 2,558,614 | 6/1951 | Jewell, Jr. | 292/129 |
| 3,620,483 | 11/1971 | Weinberger | 292/262 |

Primary Examiner—Roy D. Frazier
Assistant Examiner—Peter A. Aschenbrenner

[57] ABSTRACT

A device, for use primarily in trailers, campers, mobile homes and recreational vehicles in general, and designed expressly for securely latching and holding all types of panel doors, is herein disclosed.

The door retainer latch is a spring-actuated mechanism which is designed to securely lock the door in the open position, as in the case of trailers or mobile homes, the outer door is normally latched open and not generally used in temperate weather conditions. The latch device will securely hold the door in a fixed and immobile position, preventing movement or noise in strong gusts of wind.

1 Claim, 2 Drawing Figures

PATENTED DEC 10 1974 3,853,342

3,853,342

DOOR RETAINER LATCH

BACKGROUND OF THE INVENTION

In the development of the present invention, it was felt that hardware items of the type under discussion which were found on most trailers, campers and other recreational vehicles are in some cases, inadequate to perform the function for which they are designed, and a better and more secure latch with durable and maintenance-free characteristics was needed.

OBJECT OF THE PRESENT INVENTION

The primary object of the present invention is to provide a stable and relatively simple latch mechanism which would securely hold the door in position until released, and of a design which blends with the surface contour of the unit in which it is a part, with a profile which offers a minimum of projecting edges and corners.

DETAILED DESCRIPTION

Figure 1:
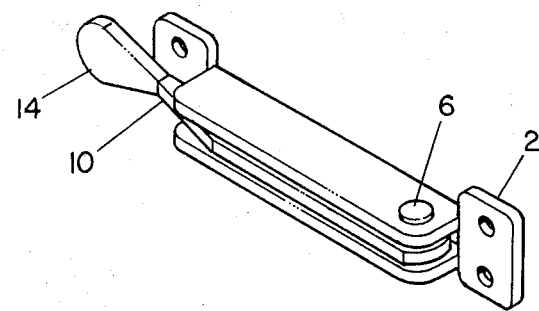
FIG. 1 is a three-dimensional illustration of the latch in a closed position.
Figure 2:
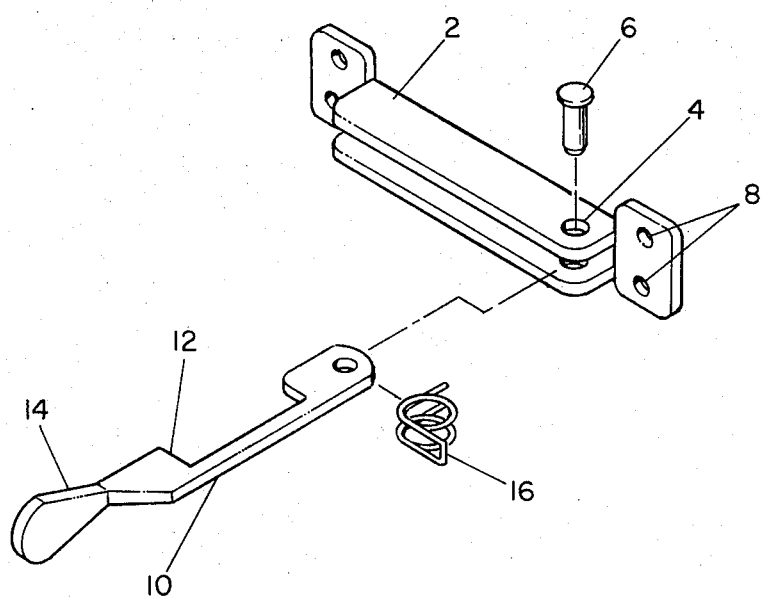
FIG. 2 is a three-dimensional disassembled view of the device, showing the related components.

A door retainer latch device intended for use on a trailer, mobile home, recreational vehicle, camper, and the like (not shown) having an entryway (not shown) to the interior thereof with the entryway protected by an outer entryway door (not shown), such as a storm door or the like, and an inner entryway door (not shown) for providing selective locked and unlocked opening and closing of the entry way into the trailer and the like. The latch device is adapted for selectively engaging a top edge, bottom edge, or outermost side edge of the outer door furthest from the hinged side of the door in a manner to latch the outer door in a fully opened position relative to the entryway such that the outer door lies in spaced parallel juxtaposition to a side wall of the trailer or the like.

The door retainer latch device consists of a body assembly 2 which is preferably formed from a unitary one-piece stamped blank of metal material having a body portion in the form of a channel member of a U-shaped cross-section with flat wing members extending outwardly from each end of the channel member substantially co-planar with the bottom edge thereof and formed integrally therewith. Extending transversely through the side walls of the body portion adjacent one end thereof are a pair of axially aligned holes 4 adapted to receive therein a pivot pin 6, the use thereof which will be later described. Further, for use in mounting the body assembly 2 to a side wall of the trailer or the like on which it is to be utilized, there is provided a pair of spaced apart mounting holes 8 in each of the wing members of the body assembly.

A latch arm 10 is provided which is formed of flat generally rectangular longitudinally extending stock of a thickness adapted to be freely received within the channel of the body assembly body portion. One end of the latch arm 10 is provided with an opening extending therethrough adapted to be pivotally received on pivot pin 6 and about which the latch arm is free to pivot between a closed position completely received in the channel of the body assembly body portion and an open position extending outwardly therefrom and substantially normal to the longitudinal axis of the body assembly body portion. A tensioned spring 16 is provided about pivot pin 6 and has one end in engagement with the body assembly body portion with the opposite end in engagement with the latch arm 10, the spring 16 resiliently biasing the latch arm into the closed position.

The side edge of the latch arm 10 most adjacent the body assembly body portion channel when the latch arm is in the open position is provided with a rectangularly shaped recess 12 extending longitudinally through a major portion thereof, this recess being of a size corresponding to the width of the entryway outer door so as to lockingly engage a top, side or bottom edge of the door therein, the edge engaged dependent upon the position of mounting of the latch device on the side wall of the trailer relative to the outer door.

For use in opening the latch arm 10 when the same is in the closed position received in the channel of the body assembly body portion, there is provided a wing member handle portion 14 formed integrally on the end of the latch arm opposed to the latch arm end having the pivot hole provided therein, the handle being disposed substantially normal to the plane of the latch arm and lying substantially co-planar with the plane defined by the side edge of the latch arm having the recess 12 provided therein.

In operation, the body assembly 2 is affixed to a trailer side wall by suitable mounting means, such as bolts, screws, or the like passing through mounting holes 8 with the channel opening outwardly from the trailer side wall. An individual then grips handle 14 in a manner to swing the latch arm 10 out of the channel against the force of spring 16 and opens the trailer outer door until an edge thereof is engaged in the recess 12, after the release of handle 14 permits spring 16 to bias latch arm 10 in the direction of body assembly 2 so as to retain recess 12 in engagement with the outer doorway edge and thus lockingly engage with the outer door and secure the same in a fully opened and latched position. When desiring to close the outer doorway, an individual grips handle 14 and moves latch arm 10 in a direction away from the outer door, this freeing the outer door to return to its normally closed position with spring 16 resiliently biasing latch arm 10 back to its closed position in the body assembly body portion channel in a neat and compact manner.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

What is claimed for the present invention is:

1. A door retainer latch device intended for use on a trailer, mobile home, recreational vehicle, and the like having an entryway providing access to the interior thereof, the entryway having an outer entryway door, such as a storm door, panel type protective travel door, or the like, and an inner entryway door provided for permitting the selective entrance into the trailer or the like, the latch device adapted for selectively engaging a top edge, bottom edge, or side edge of the outer door furthest from the hinged side edge thereof in a manner to latch the outer door in a fully opened position relative to the entryway with the outer door lying in spaced parallel juxtaposition to a side wall of the trailer or the like on which the latch device is mounted, the latch device comprising:

a longitudinally elongated channel shaped body portion having a U-shaped cross-section, the body portion including parallel vertically spaced apart horizontally extending side walls, each side wall having a back side edge, a front side edge, and opposed end edges;

a pair of flat rectangularly shaped mounting members, each mounting member affixed to one end of the side walls normal to the plane thereof and extending outwardly from its associated end in a wing-like manner, each mounting member being substantially co-planar with the plane defined by the bottom edges of the side walls;

a pair of mounting holes disposed in each mounting member and extending completely therethrough adapted to receive mounting means for affixing the mounting members and interconnecting channel shaped body portion to a side wall of the trailer or the like;

a hole disposed in one end of each body portion side wall and extending completely therethrough, the holes being in axial alignment with each other;

a pivot pin member including a cylindrical shank of a diameter to be axially inserted through the aligned holes in the body portion side walls bridging the slot gap therebetween;

a latch arm formed of flat substantially rectangular stock material having opposed longitudinally extending side edges, a back end, and a front end, the latch arm being of a thickness less than the width of the slot formed between the body portion side walls to permit free receipt of the latch arm therebetween;

an opening extending through the latch arm adjacent the back end thereof for receiving the pivot pin therethrough to pivotally mount the latch arm to the body portion between the side walls with the latch arm being pivotally movable between a closed position received between the side walls and an open position projecting outwardly of the front edge of the side walls;

a handle member formed integrally with the front end of the latch arm and projecting outwardly therefrom, the handle disposed in a plane extending normal to the plane of the latch arm and adapted to be readily gripped by an individual's hand when the latch arm is completely received between the side walls in its closed position with the handle portion projecting longitudinally outwardly of the adjacentmost end edge of the side walls in a manner parallel to the wing-like mounting members;

a rectangularly shaped recess provided in the latch arm along the side edge thereof adjacentmost the back edge of the body portion side walls when the latch arm is in the closed position, the recess being of a size and configuration adapted to engage therein an edge of the outer door; and a coiled spring disposed concentrically about the pivot pin and having one end affixed to the body portion side walls and having its opposite end in engagement with the latch arm for resiliently biasing the latch arm into the closed position, the opening of the latch arm serving to tension the spring such that upon release of the latch arm the spring tends to bias the latch arm into the direction of its closed position.

* * * * *